(12) United States Patent
Lin

(10) Patent No.: US 7,113,510 B2
(45) Date of Patent: Sep. 26, 2006

(54) HARDWARE SELF-SORTING SCHEDULING QUEUE

(76) Inventor: Xinming Allen Lin, 14365 SW. Teal Blvd., Apt. A, Beaverton, OR (US) 97008

( * ) Notice: Subject to any disclaimer, the term of this patent is extended or adjusted under 35 U.S.C. 154(b) by 1061 days.

(21) Appl. No.: 10/087,722

(22) Filed: Mar. 1, 2002

(65) Prior Publication Data

US 2003/0165149 A1 Sep. 4, 2003

(51) Int. Cl.
*H04L 12/28* (2006.01)

(52) U.S. Cl. ...................................... 370/394

(58) Field of Classification Search ........ 370/229–236, 370/359, 389, 394, 395.2, 395.21, 395.4, 370/412–419

See application file for complete search history.

(56) References Cited

U.S. PATENT DOCUMENTS

| | | | |
|---|---|---|---|
| 5,874,986 A * | 2/1999 | Gibbon et al. | 725/134 |
| 6,047,000 A * | 4/2000 | Tsang et al. | 370/412 |
| 6,226,687 B1 * | 5/2001 | Harriman et al. | 709/246 |
| 6,256,315 B1 * | 7/2001 | Barbas et al. | 370/412 |
| 6,408,006 B1 * | 6/2002 | Wolff | 370/412 |
| 6,577,635 B1 * | 6/2003 | Narayana et al. | 370/395.42 |
| 6,714,554 B1 * | 3/2004 | Jin et al. | 370/412 |
| 6,788,686 B1 * | 9/2004 | Khotimsky et al. | 370/394 |
| 2001/0030974 A1 * | 10/2001 | Pauwels | 370/444 |

OTHER PUBLICATIONS

Parhami. Data-driven control scheme for linear arrays: application to a stable insertion sorter Parallel and Distributed Systems, IEEE Transactions on vol. 10, Issue 1, Jan. 1999 pp. 23-28.*

* cited by examiner

*Primary Examiner*—Dmitry Levitan
(74) *Attorney, Agent, or Firm*—Berkeley Law & Technology Group

(57) ABSTRACT

The scheduling queue of the present invention is configured as a systolic array utilizing self-sorting scheduling cells to sort information packets based upon previously assigned priorities, while at the same time yielding a small constant latency independent of the length of the queue. The scheduling queue of the present invention is effective in supporting various Quality of Service (QoS) policies and algorithms, including both Differentiated Services (DiffServ) and Integrated Services (IntServ) having an arbitrary number of flows.

21 Claims, 6 Drawing Sheets

HARDWARE SELF-SORTING SCHEDULING QUEUE

BACKGROUND OF THE INVENTION

1. Field of the Invention

The present invention generally relates to the field of network communications. More specifically, the present invention relates to network traffic management including quality of service provisions.

2. Background Information

With advances in integrated circuit, microprocessor, networking and communication technologies, an increasing number of devices, in particular, digital computing devices, are continually being networked together. Devices are often first coupled to a local area network, such as an Ethernet based office/home network. In turn, the local area networks are interconnected together through wide area networks, such as Ethernet, SONET networks, ATM networks, Frame Relays, and the like. Of particular interest is the TCP/IP based global inter-network "Internet".

As the number of devices communicating over the Internet continues to increase, the volume and complexity of the data transmitted correspondingly continues to increase. In addition, not only do many applications such as real time audio/video transmissions and application delivery services require large amounts of network bandwidth, but they may also require that certain quality parameters such as the time it takes the data to be delivered (i.e. end-to-end latency) and inter-packet delay variation (jitter), not exceed a predetermined threshold so as to adversely affect transmission quality. Service providers often guarantee differing levels of quality of service (QoS) to subscribers, with guarantees of higher quality often costing more than guarantees of a relatively lower quality or no guarantees at all (i.e. best effort).

Integrated services and differentiated services reflect two common methodologies for implementing QoS. The integrated service model is typically concerned with individual data flows and reserves network resources, employs packet classification, admission control, and intelligent scheduling to achieve a desired QoS. A data flow generally represents a stream of packets that originate from the same user activity such as an application. In contrast, the differentiated service model basically classifies packets into a small number of service types or classes of service and applies similar techniques to all traffic that belongs to the same type or class of service. Whether an integrated service model or a differentiated service model is employed within a given network, some form of packet queuing and scheduling is typically utilized throughout the various network switching and/or routing devices in order to regulate and prioritize data transmissions.

In their simplest form, single queue implementations have been utilized whereby packets were queued and transmitted on a first-come first-served basis. That is to say that the packets were basically transmitted according to their order of arrival. For example, if packets of a first packet flow (P1) arrived in the queue before packets of a second packet flow (P2), and (P2) packets arrived in the queue before packets of a third packet flow (P3), the (P1) packets would be transmitted before the (P2) packets, which in turn would be transmitted before the (P3) packets. In this single queue implementation however, if either the (P2) packets or the (P3) packets had a higher priority (i.e. were more urgent) than the (P1) packets, head-of-line blocking would occur where the (P2) packets and the (P3) packets would be blocked by the (P1) packets. Because this method caused some packets to be unnecessarily blocked by other packets, additional delays adversely affecting QoS guarantees were commonplace.

In an effort to avoid head-of-line blocking, implementations utilizing multiple packet queues have been used. In a multiple queue implementation for example, packets of each flow are placed into their own queue enabling each flow to be directly selected by e.g. a scheduling mechanism based upon the quality of service for the flow, independently of other packet flows. However, this solution does not scale very well since the time it takes to enqueue or dequeue an information packet is dependent upon the number and length of queues utilized.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

A hardware-based self-sorting scheduling queue (hereinafter "scheduling queue") is described herein. In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention. Further, the description repeatedly uses the phrase "in one embodiment", which ordinarily does not refer to the same embodiment, although it may.

The scheduling queue of the present invention is configured as a systolic array of self-sorting scheduling cells to sort information packets based upon previously assigned priorities, while at the same time yielding a small constant latency independent of the length of the queue. The scheduling queue of the present invention is effective in supporting various Quality of Service (QoS) policies and algorithms, including both Differentiated Services (DiffServ) and Integrated Services (IntServ) having an arbitrary number of flows. In one embodiment, the scheduling queue of the present invention utilizes QoS numbers to facilitate sorting of information packets.

Many flow-based quality of service (QoS) algorithms require the assignment of QoS numbers (also commonly referred to as finish numbers, start numbers, deadlines, etc.) indicating the relative priority of each associated packet. Weighted Fair Queuing, for example, emulates an ideal scheduler called Generalized Processor Sharing (GPS) and calculates a finish number for each packet of the provisioned flows according to the following equation:

$$F_i(k, t) = \max\{F_i(k-1, t), R(t)\} + \frac{P_i(k, t)}{\phi_i}$$

where $F_i(k, t)$ is the finish number for packet k of flow i that arrived at time t, $P_i(k,t)$ is the size of the packet k, $\phi_i$ is the allocated throughput, and $R(t)$ is the round number at time t. The round number is defined to be the number of rounds of service a bit-by-bit round robin scheduler has completed at time t. Other algorithms commonly used to calculate QoS numbers include Self-Clocked Fair Queuing, Virtual Clock Queuing, and Service Curve-based Earliest Deadline First to name just a few.

Figure 1:
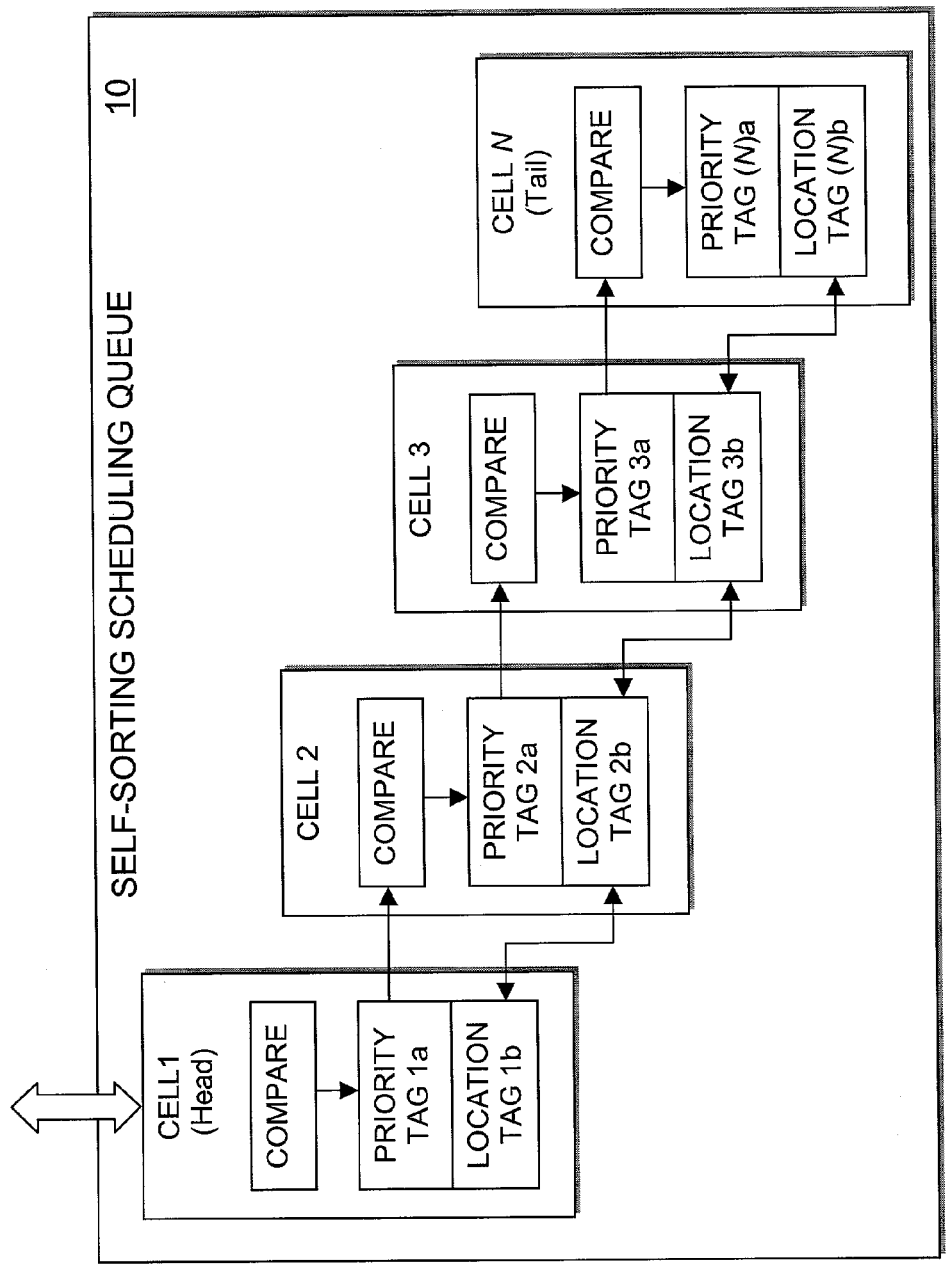
FIG. 1 illustrates a self-sorting scheduling queue in accordance with one embodiment of the present invention.

FIG. 1 illustrates a self-sorting scheduling queue of the present invention in accordance with one embodiment. Self-sorting scheduling queue 10 includes N self-sorting scheduling cells (cells 1 to N where e.g., N≧2) sequentially coupled together, with the cell located sequentially closest to the ingress point of the queue (i.e. cell 1) being designated as a head cell, and the cell located sequentially farthest from the head cell (i.e. cell N) being designated as a tail cell. In accordance with one embodiment of the invention, each cell within scheduling queue 10 (with the exception of the head cell and the tail cell) is coupled to only the immediately previous cell and the immediately subsequent cell. For example, in the embodiment illustrated in FIG. 1, cell 2 is coupled to previous cell 1 and subsequent cell 3. Generally, head cells are coupled to a queue interface on one side and to a second cell (which may also be a tail cell) on the other side. In comparison, tail cells are coupled to only a single cell immediately preceding each tail cell. In one embodiment, tail cells are further coupled to overflow detection logic to detect when tag pairs are pushed out of the respective tail cell.

Scheduling queue 10 operates to facilitate prioritization of incoming information packets based at least in part upon a relative priority level as reflected by, for example, a QoS identifier. In one embodiment, scheduling queue 10 is incorporated within a traffic management unit and QoS identifiers are assigned to each packet by e.g. a network processor coupled to the traffic management unit. In other embodiments, the traffic management unit can instead operate to assign packet priorities in addition to facilitating sorting of the packets based upon the priorities. An information packet's priority level may reflect the packet's priority relative to other information packets within a given flow, or the packet's priority relative to all packets entering a network device incorporating scheduling queue 10. Although for the purposes of this discussion it is assumed that the packet priorities are represented by numerical QoS identifiers, scheduling queue 10 is equally equipped to facilitate sorting of information packets based upon alphanumerical and non-numerical QoS identifiers just the same.

In accordance with one embodiment of the invention, scheduling queue 10 receives at least a first tag (i.e. priority tag) representing the relative priority level of a given information packet, and a corresponding second tag (i.e. location tag) identifying a location or pointer to a location where the associated information packet is stored. In one embodiment, information packets are stored in a memory device coupled to scheduling queue 10. For example, in a high-speed routing device incorporating the scheduling queue of the present invention, incoming data packets may be stored in a data buffer such as a random access memory (including SRAM, DRAM, and so forth). The memory address, or a pointer to the memory address corresponding to the storage location for each packet, is then passed as a location tag to scheduling queue 10 in order to facilitate sorting of the packets.

In accordance with one embodiment of the invention, priority and location tags are treated as tag-pairs that traverse the scheduling queue together. In addition to the head cell of scheduling queue 10 receiving priority/location tag-pairs, the head cell further receives PUSH and POP signals. In one embodiment, a PUSH signal is received by scheduling queue 10 via the head cell if an information packet is added to the memory, whereas a POP signal is received by scheduling queue 10 via the head cell if an information packet is to be removed from the memory. If the head cell receives a POP signal, the priority tag and location tag pair stored in the head cell are overwritten with the priority and location tag pair of the subsequent cell, and the POP signal is propagated to the subsequent cell. This process continues down the remainder of the queue until either an empty cell or the tail cell is reached.

A PUSH signal indicates that a tag-pair associated with a newly received information packet is available as input into scheduling queue 10. If the head cell receives a PUSH signal, the priority tag of the newly received tag pair is first compared to the priority tag stored within the head cell (if any) and a determination is made as to which corresponding information packet has a higher priority. The tag pair associated with the information packet having the higher priority is stored within a first stage of the head cell and the tag pair associated with the information packet determined to have a lower priority is stored in a second stage of the head cell to be used as input into the next subsequent cell. As with the POP signal, this process continues down the remainder of the scheduling queue until an empty cell or the tail cell is reached. In one embodiment, information packets corresponding to tag pairs that end up being pushed out of the tail cell are dropped from their associated flow, constituting an overflow condition. In one embodiment, each cell within scheduling queue 10 (with the exception of the head cell) receives a PUSH/POP signal only after the immediately previous cell received the same signal and just prior to the immediately subsequent cell receiving the same signal. In the case of the head cell, it is the first of the cells to receive the signal before the signal is propagated, in turn, through scheduling queue 10. Once the signal is propagated to the next subsequent cell, the current cell is free to process another signal regardless of the state of subsequent cells. Accordingly, the latency between queue operations is bounded to the operational latency at the head cell only, regardless of the length of the queue, which is an improvement over prior art implementations.

Figure 2:
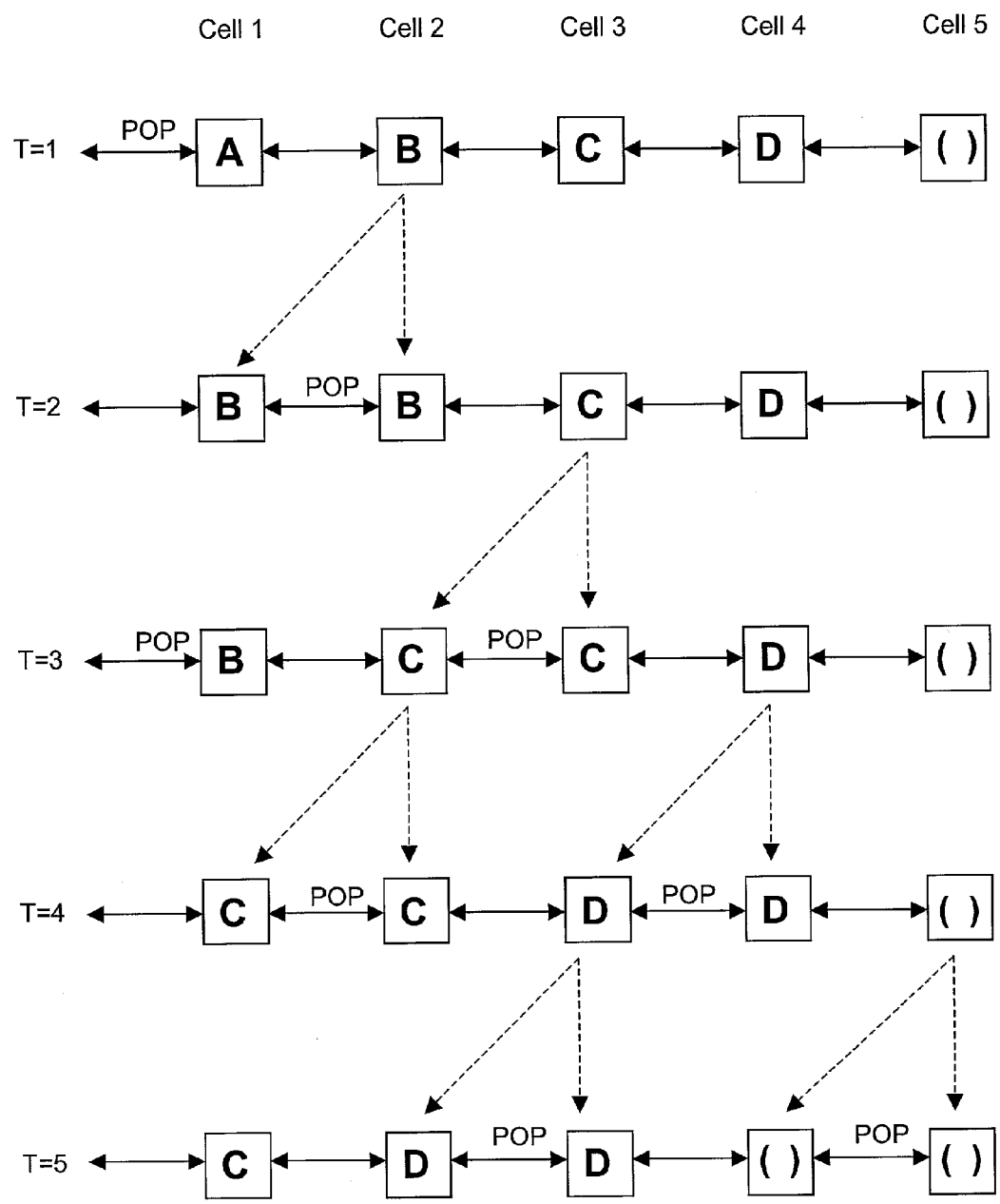
FIG. 2 illustrates a POP operation performed in accordance with one embodiment of the self-sorting scheduling queue of FIG. 1.
Figure 3:
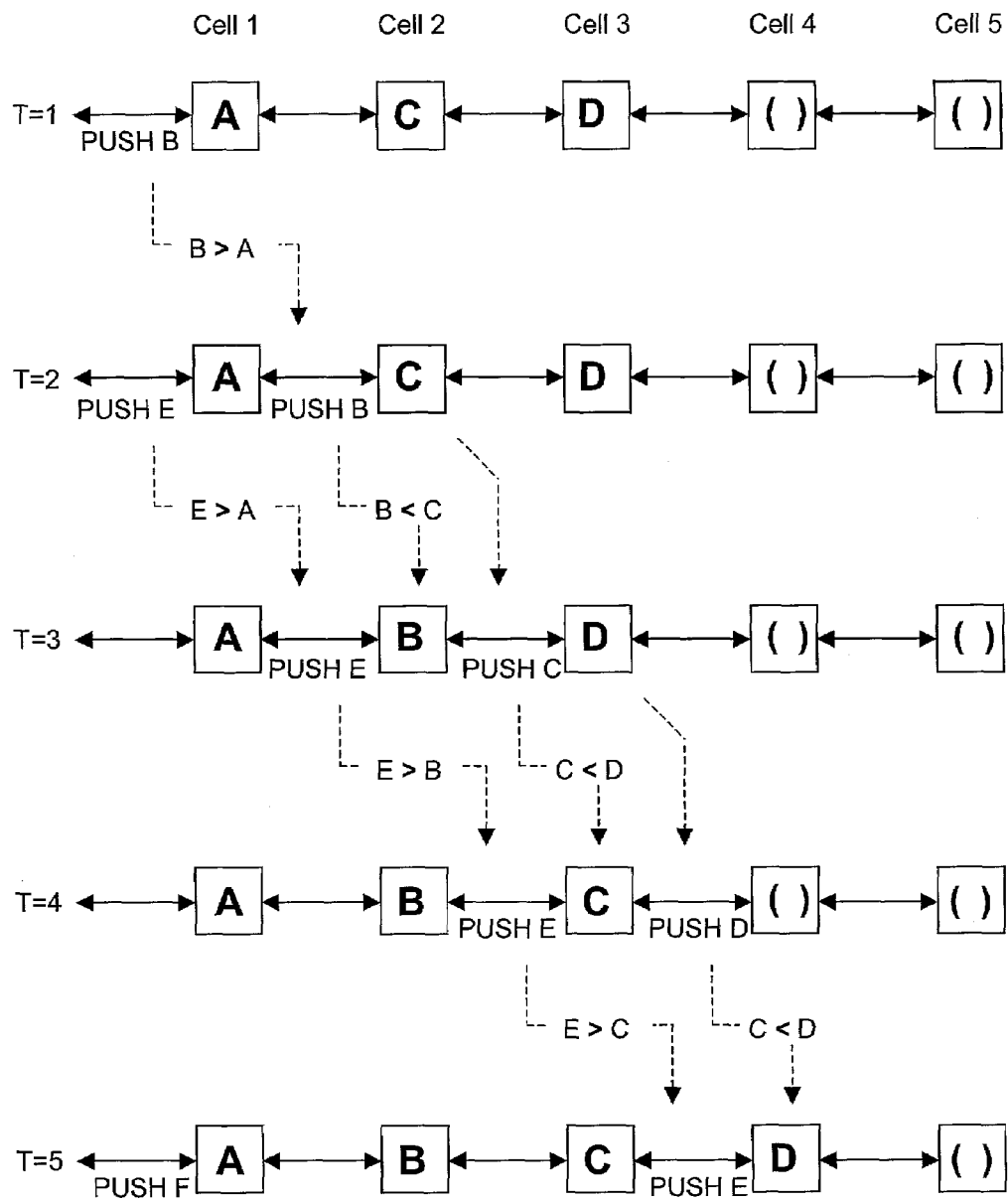
FIG. 3 illustrates a PUSH operation performed in accordance with one embodiment of the self-sorting scheduling queue of FIG. 1.
Figure 4:
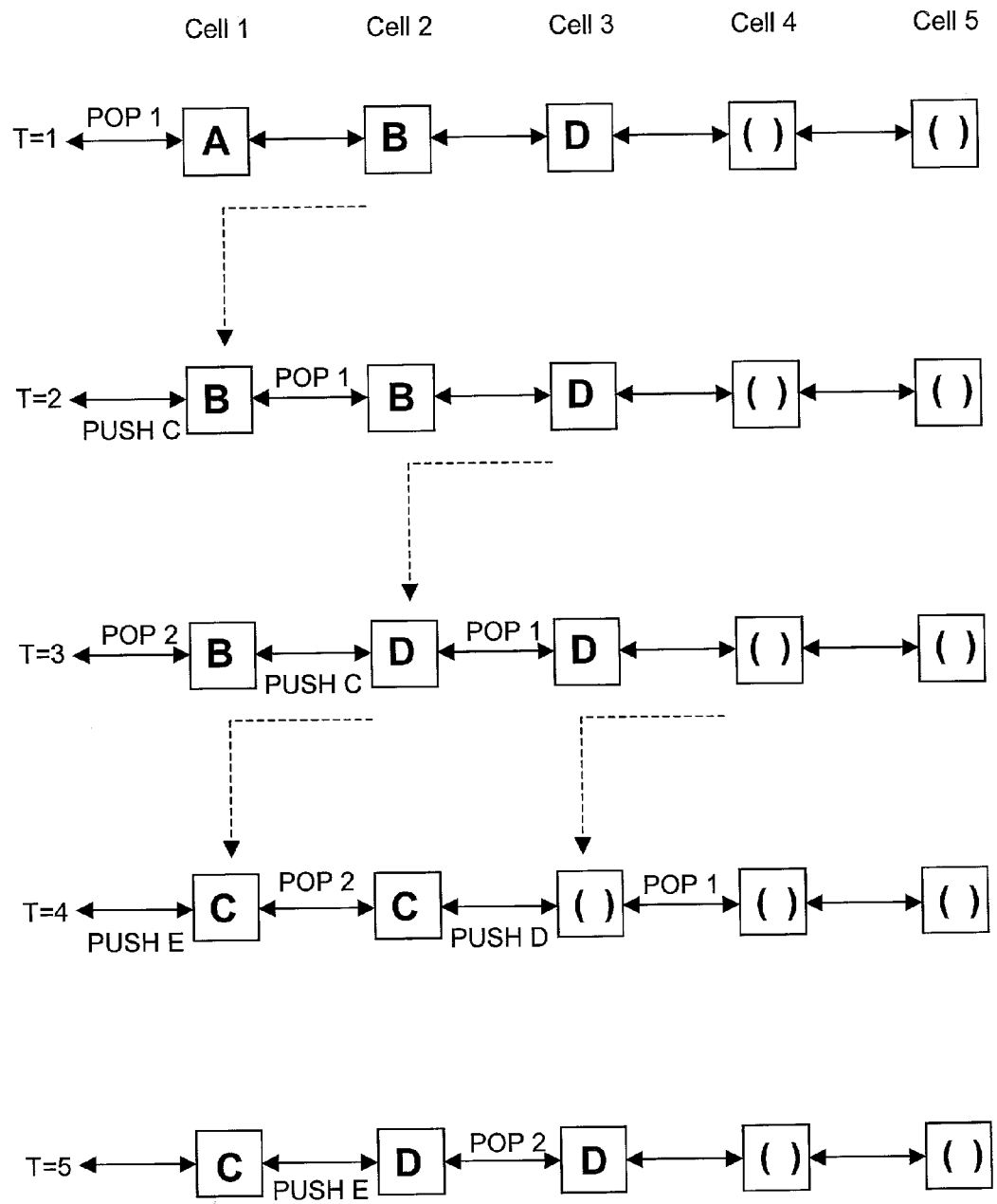
FIG. 4 illustrates combined PUSH and POP operations performed in accordance with one embodiment of the self-sorting scheduling queue of FIG. 1.

FIGS. 2–4 illustrate PUSH and POP operations performed in accordance with the scheduling queue of the present invention. More specifically, FIG. 2 illustrates POP operations propagating throughout one embodiment of a scheduling queue having five storage cells. Cells 1, 2, 3 and 4 are shown to contain priority/location tag pairs respectfully associated with information packets A, B, C and D, as shown, while cell 5 is shown to be empty. In accordance with the teachings of the present invention, a first POP signal is received by cell 1 at time interval T=1, causing the contents of cell 2 (e.g. "B") to be copied into cell 1 at time T=2. At time interval T=2, the POP signal is propagated to cell 2, which then causes the contents of cell 3 (e.g. "C") to be copied to cell 2 at time T=3. At time T=3, a second POP signal is received by cell 1, while the first POP signal is propagated to cell 3. Accordingly, the contents of cell 4 (e.g. "D") are copied to cell 3, and the contents of cell 2 (e.g. "C") are copied into cell 1 at time T=4. As the first and second POP signals continue to be propagated through the scheduling queue, the contents of the corresponding cells continue to be updated in a manner similar to that described above with respect to time intervals T=1 through T=4 as shown in FIG. 2.

FIG. 3 illustrates PUSH operations propagating throughout one embodiment of a scheduling queue having five storage cells. Cells 1,2 and 3 contain priority/location tag pairs respectively associated with information packets A, C and D, as shown. In comparison, cells 4 and 5 are shown to be empty. At time interval T=1, a PUSH signal is received by cell 1, indicating that a priority/location tag pair representing information packet "B" (i.e. tag pair B) has been received by the scheduling queue. In accordance with one embodiment of the present invention, the priority tag of corresponding information packet B is compared to the priority tag corresponding to information packet A previously stored in cell 1, to determine which information packet has the higher priority. In one embodiment, as a result of the comparison the tag pair corresponding to the information packet determined to have the greatest priority is stored in cell 1, while the tag pair corresponding to the other less urgent information packet is placed in temporary storage for subsequent comparison against to the contents of the next cell (e.g. cell 2). In the illustrated embodiment, it is assumed that information packet A has a higher priority than B, which has a higher priority than C, and so forth. Accordingly, the contents of cell 1 (e.g. "A") remain in cell 1, while the PUSH signal and associated tag pair corresponding to information packet "B", are presented as input into cell 2.

At time interval T=2, a new PUSH signal and corresponding tag pair E is received by cell 1 as the first PUSH signal is propagated to cell 2. At this point, a first comparison is made between the priority tag corresponding to information packet B and the priority tag corresponding to information packet C, while a second independent comparison is made between the priority tag corresponding to information packet E and the priority tag corresponding to information packet A. Because information packet "B" is determined to have a higher priority than information packet "C", at time T=3 the tag pair corresponding to information packet B is stored into cell 2 while the previous contents of cell 2 (e.g. "C") are placed in temporary storage for subsequent comparison against the contents of cell 3. At the same time, because information packet "E" is deemed to have a lower priority than information packet "A", at time T=3 the PUSH signal and associated tag pair corresponding to information packet E are presented as input into cell 2. The tag pair comparison/sorting process continues until all tag pairs have been stored in a cell and no PUSH/POP signals remain to be serviced. In one embodiment, if more information packets are received than there are cells for in the scheduling queue, the information packets having the lowest priorities are dropped. This may happen when either too many well-behaved flows are backlogged at the same time indicating that the output bandwidth has been oversubscribed, or the dropped packets belong to misbehaved flows.

FIG. 4 illustrates operation of combined PUSH and POP signals within a scheduling queue of the present invention, in accordance with one embodiment. As described with respect to FIGS. 2 and 3, the PUSH and POP signals of FIG. 4 each operate on one cell at a time before being propagated to the next sequential cell.

Figure 5:
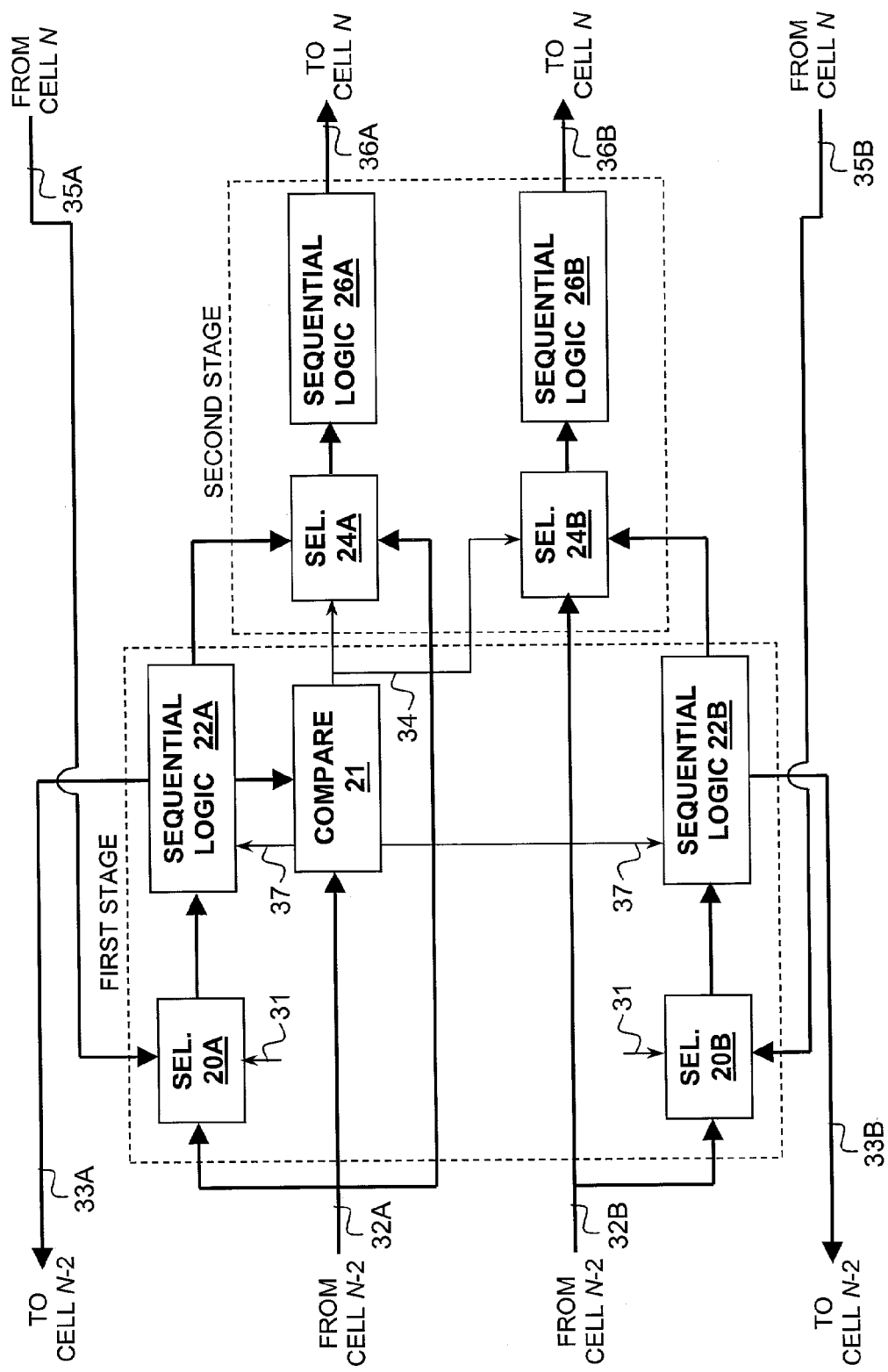
FIG. 5 illustrates an $(N^{th}-1)$ storage cell of a scheduling queue having N cells, in accordance with one embodiment of the present invention.

FIG. 5 illustrates an ($N^{th}$−1) storage cell of a scheduling queue having N cells, in accordance with one embodiment of the present invention. The ($N^{th}$−1) cell is generally intended to be representative of cells 1 through N, however cell 1 (i.e. the head cell) and cell N will each only be connected to one other cell. The ($N^{th}$−1) storage cell of FIG. 5 is divided into a first stage including first selection logic (20A & 20B), first sequential logic (22A and 22B), and comparison logic 21, as well as a second stage including second selection logic (24A and 24B) and second sequential logic (26A and 26B) coupled together as shown. Cell (N−1) is coupled to the immediately previous cell (N−2) via signal lines 32A, 32B, 33A and 33B, and coupled to the immediately subsequent cell (e.g. cell "N") via signal lines 35A, 35B, 36A and 36B. In one embodiment, each element of the first and second selection logic represents a data selector, such as a multiplexer, to route data from any one of several inputs to an output. Likewise, in one embodiment, the first and second sequential logic elements (22A, 22B, 26A, 26B) each represent one or more stateful elements such as a latch or flip-flop to store one or more bits of data. In one embodiment, sequential logic elements 22A and 26A represent logic elements equipped to store a 32-bit QoS identifier, and sequential logic elements 22B and 26B represent logic elements equipped to store a 16-bit location tag. In one embodiment, each sequential logic element operates synchronously based upon an input signal such as a clock to trigger latching of data.

Signal lines 32A and 32B represent input signal lines upon which priority and location tag pairs are received. In one embodiment, signal line 32A receives priority tags indicating a relative priority of an associated information packet, whereas signal line 32B receives location tags identifying a location or pointer to a location where the associated information packet is stored. Signal lines 35A and 35B receive data stored in the first sequential logic of the next subsequent cell (N), while signal lines 36A and 36B forward priority/location tag pairs from sequential logic 26A and 26B to the next subsequent cell (N). In one embodiment, priority/location tag pairs are forwarded from sequential logic 26A and 26B to the immediately subsequent cell in response to a PUSH signal being received. Cell (N−1) further includes control logic (not shown) coupled to only the immediately previous cell (N−2) and the immediately subsequent cell (N) to receive control signals from the immediately previous cell and forward delayed representations of the control signals, such as PUSH and POP signals to the immediately subsequent cell. In one embodiment, the control logic includes a D Flip-Flop.

Selection logic 20A includes a first input signal line 32A coupled to the second sequential logic of the immediately previous cell (e.g. cell N−2), a second input line 35A coupled to the first sequential logic of the immediately subsequent cell (N), an output signal line coupled to sequential logic 22A, and a control/select line 31 coupled to control logic (not shown) of cell (N−2) to receive signals representing e.g. the PUSH and POP signals previously described.

Similarly, selection logic 20B includes a first input signal line 32B coupled to second sequential logic of cell (N−2), a second input line 35B coupled to first sequential logic of the immediately subsequent cell (N), an output signal line coupled to sequential logic 22B, and a control/select line 31 also coupled to control logic of cell (N−2). Accordingly, if a first signal (e.g. logic high) indicating a POP operation is detected by selection logic 20A and 20B, input from the immediately subsequent cell (N) is passed through to sequential logic 22A and 22B, respectively, effectively copying the priority/location tags one cell closer to the head cell. On the other hand, if a second signal (e.g. logic low) indicating a PUSH operation is detected by selection logic 20A and 20B, then data stored in second sequential logic of cell (N−2) is passed to either sequential logic 22A and 22B or 26A and 26B depending at least in part upon the outcome of a comparison performed by comparison logic 21 coupled to sequential logic 22A.

Comparison logic 21 represents one or more logic elements equipped to make a determination as to which of two information packets has the higher priority based at least in part upon the outcome of a comparison between the packets' respective priority tags. In one embodiment, comparison logic 21 includes one or more full adders to perform the comparison between the priority tags. Comparison logic 21 receives a first priority tag input from sequential logic 22A and a second priority tag input from the second sequential logic of the immediately previous cell (N−2), which are then compared. In one embodiment, the information packet associated with the priority tag having the largest value is deemed to have the greatest priority, whereas in an alternative embodiment, the information packet associated with the priority tag having the least value is deemed to have the greatest priority. Based on the outcome of the comparison, control/select line 34 is set accordingly to enable the priority/location tag pair to pass from either sequential logic 22A and 22B to sequential logic 26A and 26B (via selection logic 24A and 24B), or from the second sequential logic of the immediately previous cell (N−2) to sequential logic 26A and 26B (via selection logic 24A and 24B and signal lines 32A and 32B). Thus, sequential logic 26A and 26B function as temporary storage for tag pairs prior to their being "pushed" or forwarded to the next subsequent cell. Additionally, based on the outcome of the comparison, control line 37 causes sequential logic 22A and 22B to receive the priority/location tags from selection logic 20A and 20B. In one embodiment, comparison logic 21 is only operative in response to the corresponding cell receiving a PUSH signal. That is, in accordance with one embodiment of the invention, if a given cell receives a POP signal, no comparison need be performed within that cell.

In one embodiment, the storage cell of FIG. 5 further includes an empty indicator to indicate whether the cell contains priority/location tags corresponding to a stored information packet. Accordingly, if the empty indicator identifies that the cell is empty (i.e. does not contain tags corresponding to a stored information packet), comparison logic 21 is not operative independent of the operation to be performed. That is, if a given cell is empty, there is no need to perform a comparison, as each of the subsequent cells in the scheduling queue will also be empty due to the propagation of the control signals.

Because QoS identifiers (e.g. start/finish numbers) belonging to a particular flow continue to increase with the lapse of time, there is a chance that the QoS number may eventually overflow and wrap around causing a lower priority information packet to incorrectly appear to have a higher priority than it actually does. To prevent such an overflow condition from occurring, one of at least two precautions may be taken. First, combinatorial logic can be used to model a priority scheme whereby a priority number that is greater than the largest acceptable number is treated as wrapping around so as to fall somewhere within the acceptable range of priority numbers, while still allowing the relative priorities of two information packets to be determined. Second, an additional arbitrarily large register may be included to store a base QoS number. As each successive information packet is received the QoS number will vary by some delta from the base QoS number. It is this delta value that could be used as a priority tag rather than the entire QoS number. As the delta grows large enough to approach causing an overflow condition, the base QoS number may be updated and the delta reset. Each time a reset occurs, the priority tags already stored within the scheduling queue will need to be updated based upon the new base QoS number.

Figure 6:
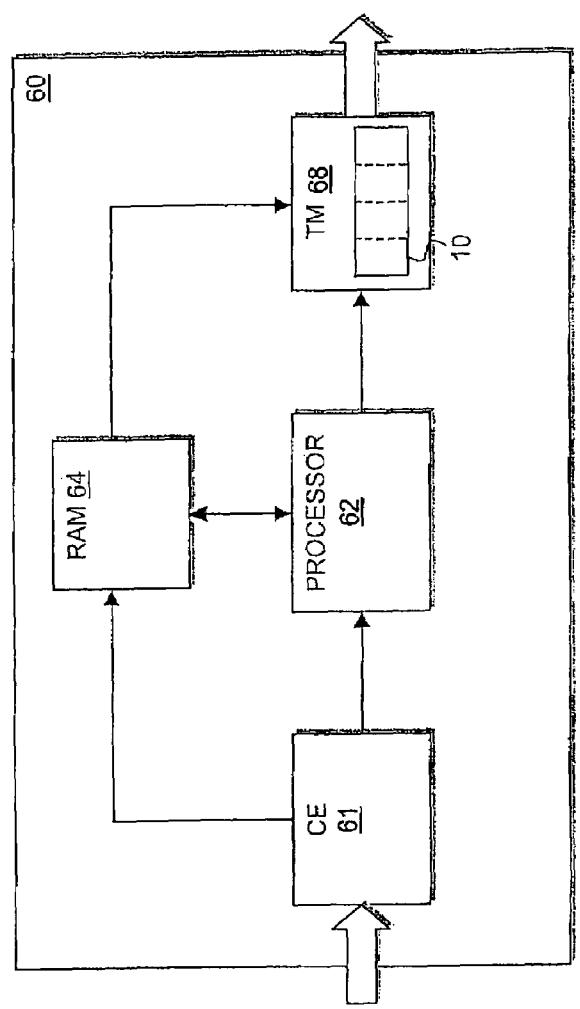
FIG. 6 illustrates an example system incorporating the scheduling queue of the present invention.

FIG. 6 illustrates an example switching apparatus incorporating the teachings of the present invention. Switch 60 includes classification engine 61, network processor 62, random access memory (RAM) 64, and traffic manager 68 including scheduling queue 10 of the present invention, connected as shown. In accordance with the illustrated example, switch 60 receives information packets via classification engine 61. In the illustrated embodiment, classification engine 61 identifies and classifies the received information packets based upon one or more characteristics of the incoming information packets. Classification engine 61 then stores the information packets in RAM 64 and forwards an associated flow identifier to network processor 62. In addition classification engine 61 may also forward packet headers to network processor 62 for further processing. In one embodiment, network processor 62 assigns QoS identifiers to each packet based upon each information packet's relative priority level, however other components of switch 60 may also assign the QoS identifiers. In one embodiment of the invention, the assigned priority identifier and the corresponding location of each stored information packet (e.g. as represented by the memory address or a pointer to the memory address of the stored information packet) are transmitted to traffic manager 68 as priority/location tag pairs to be stored in scheduling queue 10. In one embodiment, traffic manager 68 issues a signal indicating a PUSH operation to the head cell of scheduling queue 10 upon receiving the priority/location tag pair. The PUSH signal continues to be propagated, in turn, through the remainder of scheduling queue 10 until either an empty cell or the tail cell is reached.

Once switch 60 (e.g. via traffic manager 67) makes a determination (e.g. based upon conditions of the network) that an information packet is ready to be transmitted out of switch 60, queue interface 68 issues a signal indicating a POP operation to the head cell of scheduling queue 10 causing the corresponding priority/location tag pair stored in the head cell to be removed from scheduling queue 10. The POP signal is then propagated, in turn, through the remainder of scheduling queue 10 causing each tag pair stored within scheduling queue 10 to be advanced toward the head cell by one cell position.

Thus, in accordance with the teachings of the present invention, after initial processing of a first control signal (i.e. indicating a PUSH or POP operation), the head cell is freed to process additional control signals before the sorting of the tag pair associated with the first control signal has completed.

CONCLUSION AND EPILOGUE

It can be seen from the above descriptions, a novel scheduling queue arrangement has been described. While the present invention has been described in terms of the above-described embodiments, the present invention is not limited to the embodiments described. As the present invention can be practiced with further modification and alteration within the spirit and scope of the appended claims, the description is to be regarded as illustrative instead of restrictive on the present invention.

What is claimed is:

1. In a queue having a plurality of cells, a method comprising:
    receiving a first tag identifying a first storage location of a first information packet, and a corresponding second tag identifying a relative priority for the first information packet;
    storing said first tag and said second tag in a first stage of a first queue cell;
    receiving a third tag identifying a second storage location of a second information packet, and a corresponding fourth tag identifying a relative priority for the second information packet;
    receiving by said first queue cell, a first control signal representing one of at least a pop operation and a push operation, wherein said pop operation causes said first and second tags to be passed to a previous one of said plurality of cells, and wherein said push operation causes said second tag to be compared to said fourth tag to determine a relative order of precedence between said first and second information packets, wherein said third and fourth tags are stored in a second stage of said first cell if said first information packet is awarded precedence based at least in part upon said comparison, and wherein said first and second tags are stored in said second stage of said first cell while said third and fourth tags are stored in said first stage of said first cell if said second information packet is awarded precedence based at least in part upon said comparison; and
    propagating said first control signal representing one said pop and push operation to a subsequent one of said plurality of cells.

2. The method of claim 1, wherein said first and second information packets are derived from a common data flow.

3. The method of claim 1, wherein said first and second information packets are derived from different data flows.

4. The method of claim 1, wherein if said first cell forms a head of said queue said first control signal is received from a traffic management unit, and if said first cell forms a tail of said queue, then said control signal is received from an immediately preceding cell.

5. The method of claim 4, further comprising:
    forwarding either the first and second tags or the third and fourth tags depending upon the determined order of precedence, from the second stage of said first cell to a next subsequent cell if said first cell is not the tail of said queue; and
    dropping either said first information packet or said second information packet depending upon the determined order of precedence, if said first cell is the tail of said queue.

6. The method of claim 1, wherein said second information packet is awarded precedence if said fourth tag is determined to be greater than said second tag.

7. The method of claim 1, wherein said first information packet is awarded precedence if said second tag is determined to be greater than said fourth tag.

8. The method of claim 1, wherein said pop operation is immediately followed by said push operation and wherein said push operation is immediately followed by one of said push operation and said pop operation.

9. The method of claim 1, wherein said pop operation further causes a fifth tag identifying a third storage location of a third information packet, and a corresponding sixth tag identifying a relative priority for the third information packet to be passed from said next subsequent cell to the first cell.

10. A scheduling queue comprising:
    a plurality of sequentially coupled storage cells including at least a first storage cell having first sequential logic to store either a first pointer indicating a storage location of a newly received information packet and a corresponding first identifier indicating a priority level for the newly received information packet, or a second pointer indicating a storage location of a previously received information packet and corresponding second identifier indicating a priority level for the previously received information packet;
    a first selector pair coupled to said first sequential logic to selectively pass to said first sequential logic, either said first pointer and corresponding first identifier, or said second pointer and corresponding second identifier based at least in part upon a control signal received from a previous one of said plurality of sequentially coupled storage cells;
    a comparator coupled to said first sequential logic to perform a comparison between contents of said first sequential logic and the first identifier, based at least in part upon said control signal;
    a second selector pair coupled between the first sequential logic and second sequential logic to pass either the contents of said first sequential logic, or the first pointer and corresponding first identifier to the second sequential logic for forwarding to a subsequent cell based at least in part upon said comparison; and
    control logic to propagate said control signal to said subsequent cell.

11. The scheduling queue of claim 10, wherein said newly received information packet and said previously received information packet are derived from a common data flow.

12. The scheduling queue of claim 10, wherein said newly received information packet and said previously received information packet are derived from different data flows.

13. The scheduling queue of claim 10, wherein if said first cell forms a head of said queue said first control signal is received from a traffic management unit coupled to said scheduling queue, and if said first cell forms a tail of said queue, said control signal is received from an immediately preceding cell.

14. The scheduling queue of claim 10, wherein said comparison is performed when said control signal indicates a push operation and said comparison is not performed when said control signal indicates a pop operation.

15. The scheduling queue of claim 10, further comprising an empty cell indicator to indicate whether said first storage cell is associated with a currently stored information packet, and wherein said comparison is performed only when said first storage cell is associated with a currently stored information packet.

16. The scheduling queue of claim 10, wherein said first sequential logic comprises a first latch pair to store said first pointer and said first identifier, and said second sequential logic comprises a second latch pair to store said second pointer and said second identifier.

17. The scheduling queue of claim 10, wherein the storage location of said newly received information packet and the storage location of the previously received information packet are external to said scheduling queue.

18. An integrated circuit comprising:
a plurality of sequentially coupled storage cells including at least a first storage cell having first storage means to store either a first pointer indicating a storage location of a newly received information packet and a corresponding first identifier indicating a priority level for the newly received information packet, or a second pointer indicating a storage location of a previously received information packet and corresponding second identifier indicating a priority level for the previously received information packet;
a first selection means coupled to said first storage means to selectively pass to said first storage means, either said first pointer and corresponding first identifier, or said second pointer and corresponding second identifier based at least in part upon a control signal received from a previous one of said plurality of sequentially coupled storage cells;
first comparison means coupled to said first storage means to perform a comparison between contents of said first storage means and the first identifier, based at least in part upon said control signal;
second selection means coupled between the first storage means and second storage means to pass either the contents of said first storage means, or the first pointer and corresponding first identifier to the second sequential logic for forwarding to a subsequent cell based at least in part upon said comparison; and
control means to propagate said control signal to said subsequent cell.

19. A hardware based scheduling queue comprising:
a plurality of sequentially connected cells each equipped with a plurality sequential logic and selectors to receive a pointer to a storage location of an information packet and a corresponding identifier indicating a priority level for the information packet from either a previous or a subsequent cell within the scheduling queue based at least in part upon a control signal propagated through the scheduling queue;
said control signal indicating one of a pop signal and a push signal, wherein said pop signal causes a first pointer and first identifier stored in a first cell to be copied into a previous cell, and wherein said push signal causes said first identifier to be compared with a second identifier corresponding to a second newly received information packet to determine a relative order of precedence between said first and second information packets;
said second identifier and corresponding second pointer being temporarily stored for presentation to said second cell if said second information packet is assigned a greater precedence than said first information packet; and
said first pointer and said first identifier being temporarily stored for presentation to said second cell, and said second identifier and corresponding second pointer being temporarily stored in the first cell in place of said first pointer and first identifier, if said first information packet is assigned a greater precedence than said second information packet.

20. The integrated circuit of claim 19, wherein said newly received information packet and said previously received information packet are derived from a common data flow.

21. The integrated circuit of claim 19, wherein said newly received information packet and said previously received information packet are derived from different data flows.

* * * * *